No. 613,561. Patented Nov. 1, 1898.
S. D. DENSMORE.
WHEEL TIRE FOR BICYCLES OR OTHER VEHICLES.
(Application filed Sept. 24, 1897.)
(No Model.)
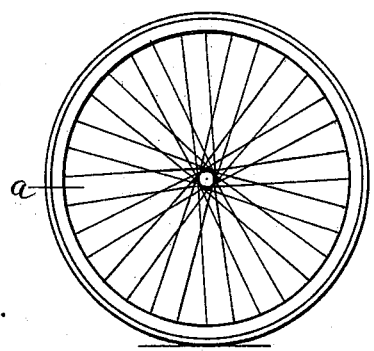
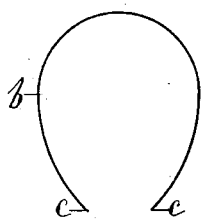
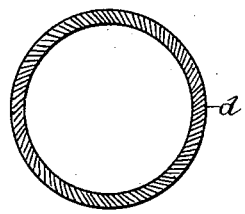
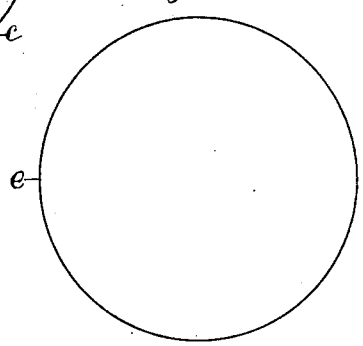
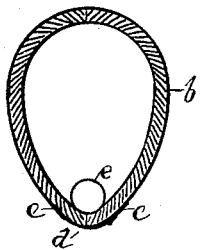
WITNESSES:
Samuel D. Densmore
INVENTOR

UNITED STATES PATENT OFFICE.

SAMUEL D. DENSMORE, OF BOSTON, MASSACHUSETTS.

WHEEL-TIRE FOR BICYCLES OR OTHER VEHICLES.

SPECIFICATION forming part of Letters Patent No. 613,561, dated November 1, 1898.

Application filed September 24, 1897. Serial No. 652,943. (No model.)

*To all whom it may concern:*

Be it known that I, SAMUEL D. DENSMORE, of Boston, county of Suffolk, and State of Massachusetts, have invented a Special Tire for Bicycle-Wheels and other Vehicles, of which the following description, in connection with the accompanying drawings, is a specification, like letters on the drawings representing like parts.

My invention consists in the construction of a bicycle-tire, that will be hereinafter described, in the following manner:

Figure 1 is a side elevation of a bicycle-wheel embodying this invention. Fig. 2 is a rim for a bicycle-wheel. Fig. 3 is a rubber tube for tire. Fig. 4 is a steel spring for tire. Fig. 5 is a transverse section showing the construction of the tire $a$.

The rim $b$ is of oval shape, to have a smooth surface, is thin and springy, and has a closure $c$ at the points. (Best shown in Fig. 2.) The rubber tube $d$ is on a circle and held in place by the closure $c$ of the rim $b$ (best shown in Fig. 5) and projects through the opening of said rim to a uniform shape at the point. The steel spring $e$ is hollow and resilient, is swung in the rubber tube $d$, and rounds it out to a perfect circle. When the weight is on the lowest point of the tire $a$, the steel spring $e$ will be pressed out to all corresponding points of the rubber tube $d$ and is the member on which the wheel principally runs. (Best shown in Fig. 5.) In practice hard thumping will spring the rim $b$ toward the center, together with the steel spring $e$, closing the rubber tube $d$ in, causing the tire $a$ to have a vertical give, and required ease to the rider secured. The steel spring is placed in the rubber tube and each has its end connected before the tire is put together. The spokes are fastened to the rim in the ordinary manner.

I claim—

A tubular spring-rim, open on its outer periphery; a hollow rubber tire located therein with its tread portion protruding therefrom and a spring hoop or band within the tire adapted to force the said tire to a degree through the opening in the rim, substantially as described.

In testimony whereof I have signed my name to this specification in the presence of two subscribing witnesses.

SAMUEL D. DENSMORE.

Witnesses:
R. S. BARROWS,
I. M. KENT.